United States Patent
Cragun et al.

(10) Patent No.: US 8,903,726 B2
(45) Date of Patent: Dec. 2, 2014

(54) VOICE ENTRY OF SENSITIVE INFORMATION

(75) Inventors: Brian John Cragun, Rochester, MN (US); Marc Kevin Johlic, Seminole, FL (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 13/463,377

(22) Filed: May 3, 2012

(65) Prior Publication Data

US 2013/0297316 A1    Nov. 7, 2013

(51) Int. Cl.
*G10L 21/00*    (2013.01)

(52) U.S. Cl.
USPC .......................... 704/273; 704/270; 704/275

(58) Field of Classification Search
CPC . G10L 15/22; G10L 2015/088; G10L 15/265; G10L 17/00; G10L 17/24
USPC .......................................... 704/270, 273, 275
See application file for complete search history.

(56) References Cited

U.S. PATENT DOCUMENTS

| | | | |
|---|---|---|---|
| 5,765,129 A * | 6/1998 | Hyman et al. | 704/270 |
| 6,290,566 B1 * | 9/2001 | Gabai et al. | 446/175 |
| 7,184,952 B2 * | 2/2007 | Hillis et al. | 704/213 |
| 7,212,969 B1 * | 5/2007 | Bennett | 704/273 |
| 7,870,142 B2 * | 1/2011 | Michmerhuizen et al. | 707/755 |
| 8,560,321 B1 * | 10/2013 | Yeracaris et al. | 704/270.1 |
| 8,600,758 B2 * | 12/2013 | Deshmukh et al. | 704/271 |
| 2006/0241939 A1 * | 10/2006 | Hillis et al. | 704/213 |
| 2009/0144829 A1 * | 6/2009 | Grigsby et al. | 726/26 |
| 2010/0169182 A1 * | 7/2010 | Madani | 705/21 |
| 2010/0185449 A1 * | 7/2010 | Wu et al. | 704/275 |
| 2010/0202596 A1 | 8/2010 | Andrews et al. | |
| 2011/0184725 A1 * | 7/2011 | Connor | 704/9 |
| 2011/0218798 A1 * | 9/2011 | Gavalda | 704/201 |
| 2011/0295601 A1 * | 12/2011 | Malinsky | 704/231 |
| 2011/0317828 A1 * | 12/2011 | Corfield | 379/265.02 |
| 2012/0079282 A1 * | 3/2012 | Lowenstein et al. | 713/189 |
| 2012/0239406 A1 * | 9/2012 | Langehoveen Brummer et al. | 704/264 |
| 2013/0060561 A1 * | 3/2013 | O'Dell et al. | 704/9 |

OTHER PUBLICATIONS

Caliendo et al.;Visual Obfuscation of sensitive information by using color masking, May 24, 2011.
Application-driven method to obfuscate sensitive data submission to avoid key logging, Aug. 16, 2011.
IBM, Method for Community Sourcing of Call Centers, Nov. 9, 2009.

* cited by examiner

*Primary Examiner* — Douglas Godbold
(74) *Attorney, Agent, or Firm* — Garg Law Firm, PLLC; Rakesh Garg; William Stock (57) ABSTRACT

A method, system, and computer program product for voice entry of information are provided in the illustrative embodiments. A conversion rule is applied to a voice input. An entry field input is generated, wherein the conversion rule allows the voice input to be distinct from the entry field input, and wherein the voice input obfuscates the entry field input. The entry field input is provided to an application, wherein the entry field is usable to populate a data entry field in the application.

19 Claims, 6 Drawing Sheets

VOICE ENTRY OF SENSITIVE INFORMATION

BACKGROUND

1. Technical Field

The present invention relates generally to a method, system, and computer program product for data input. More particularly, the present invention relates to a method, system, and computer program product for voice entry of sensitive information.

2. Description of the Related Art

Many applications, executing on a variety of computing devices or data processing systems, require user input. Often, a user input is a data entry into a data entry field (entry field) specified for receiving that user input.

The entry field may be an input field in a form, document, database, or any other application where a user input can be accepted. The data processing system executing such an application can be a commonly available computer, remote terminal, or portable device. For example, a computer can execute a spreadsheet application, which can accept data—a user input—in a spreadsheet cell—the entry field. As another example, a smartphone can execute an application that accepts a password—a user input—in a password field—the entry field.

The user can provide the input in a variety of ways. For example, a user can use a keyboard to type text in the entry field. As another example, the user can speak into a microphone associated with the data processing system to speak the input, which is then converted to text and inserted in the entry field. As another example, a user can gesture relative to the data processing system, with or without a pointing device, the gesture being interpreted as a user input. The gesture is then translated into text for data entry into the entry field.

SUMMARY

The illustrative embodiments provide a method, system, and computer program product for voice entry of information. An embodiment applies, using a processor and a memory, a conversion rule to a voice input. The embodiment generates an entry field input. The conversion rule allows the voice input to be distinct from the entry field input, and the voice input obfuscates the entry field input. The embodiment provides the entry field input to an application, where the entry field is usable to populate a data entry field in the application.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Within the context of the illustrative embodiments described herein, a data processing system that accepts a voice input from a user is assumed to be configured with a voice capturing device, such as a microphone. A voice entry is a sound pattern that can eventually be converted into text using an embodiment. The act of performing voice entries is a manner in which a voice entry is provided to a data processing system. Unless otherwise specified, the voice entry can include human generated sound patterns, machine generated sound patterns, sounds in human-audible range, ultra-high or ultra-low frequency sounds, or a combination thereof.

The illustrative embodiments recognize an increasing trend towards using eyes-free and/or hands-free ways of data input. Voice entry is an eyes-free and hands-free solution that allows a user to provide data input using voice, sound, or speech. The illustrative embodiments further recognize that some data that is input using voice entry methods can be security sensitive. For example, a user speaking a password into a data processing system, such as a mobile phone, may want to avoid being overheard. A doctor entering a patient's medical information by voice may want the convenience of voice entry but may be concerned of the risk of others hearing the information as well.

Personal information, data security information, authentication information, medical information, and many other categories of information are widely regarded as sensitive information. However, the illustrative embodiments are not intended to be limited on only that information or data that is commonly regarded as sensitive information. For example, information, about a person's age may be sensitive information to that person, but not to others. Generally, within the scope of the illustrative embodiments, any information can be regarded as sensitive information, whose entering can benefit from an embodiment.

The illustrative embodiments recognize that dealing with voice entry of sensitive information on data processing systems, including but not limited to portable devices, is problematic because of the risk of intentional eavesdropping or inevitable overhearing by other persons or devices proximate to the provider of the voice entry. Individuals who are impaired are particularly vulnerable to such audio observation because they may not be able to detect who is around them, they may not be able to remove themselves to a private setting, and voice entry may be the only modality open to them as means of input.

The illustrative embodiments used to describe the invention generally address and solve the above-described problems and other problems related to making voice entries. The illustrative embodiments provide a method, system, and computer program product for voice entry of sensitive information.

The illustrative embodiments are described with respect to certain inputs and conversions only as examples. Such descriptions are not intended to be limiting on the invention. For example, an illustrative embodiment described with respect to converting a voice entry by selecting a character at a predetermined index can be implemented with respect to another manner of converting the voice entry without limitation.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
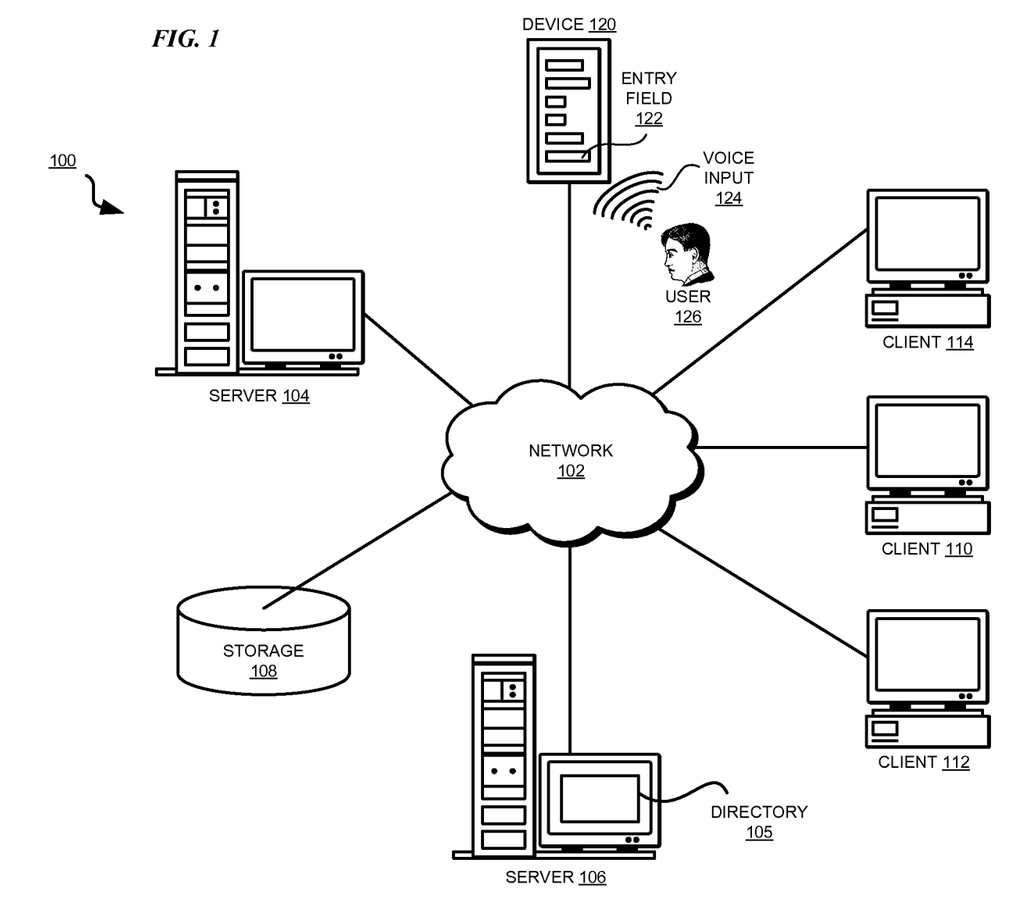
FIG. 1 depicts a pictorial representation of a network of data processing systems in which illustrative embodiments may be implemented.
Figure 2:
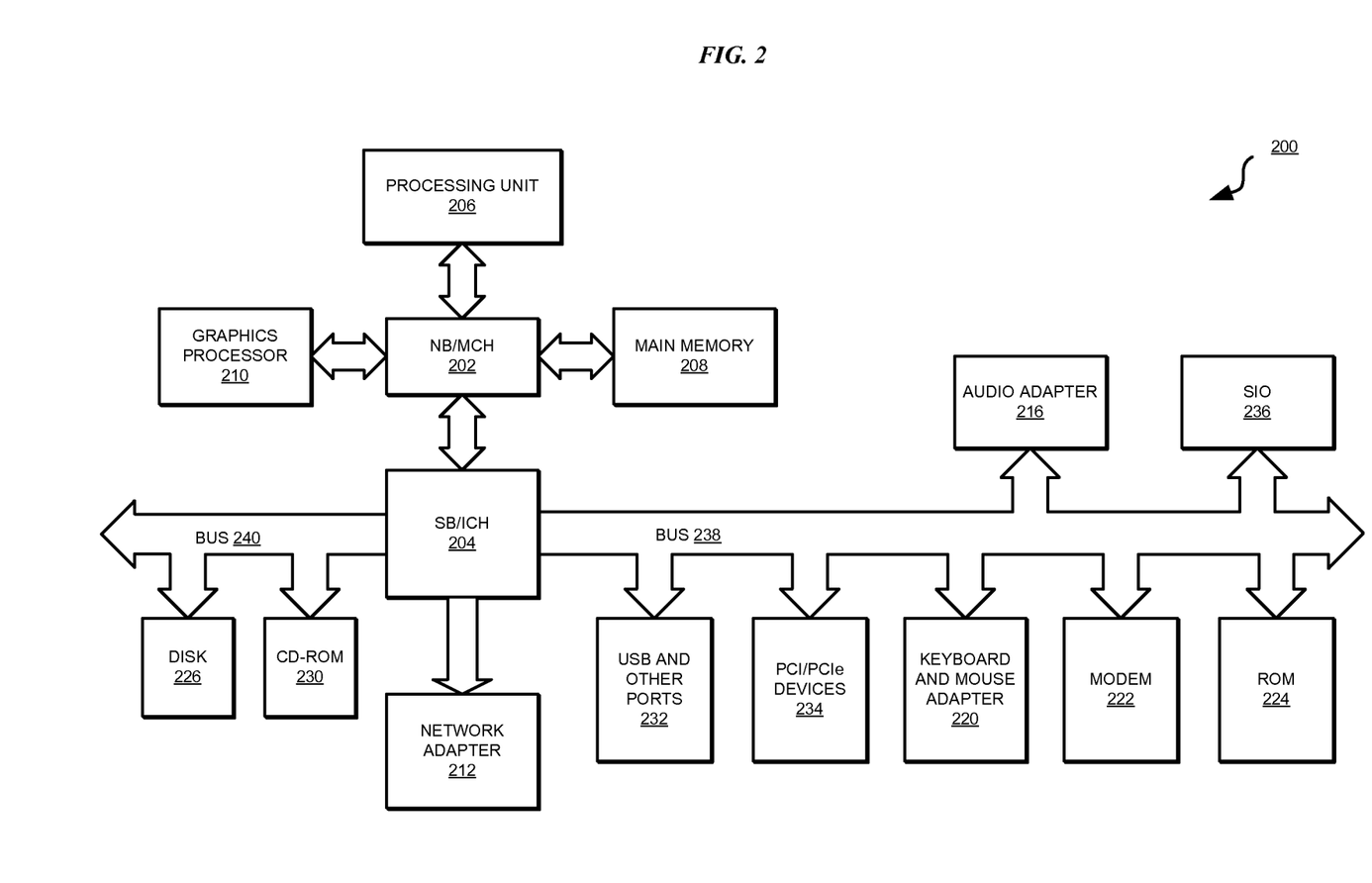
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communication links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Device 120 is an example portable device that connects to network 102. Any of servers 104 and 106, any of clients 110, 112, and 114, or device 120 that accepts voice entries is equipped with a voice capturing device (not shown), such as a microphone. As an example, device 120 includes an application (not shown) that presents a form including entry field 122. Speech 124 from user 126 forms a voice entry that is converted to data for entry field 122 according to an embodiment. An application implementing an embodiment executes in device 120.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment, in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Graphics processor 210 may be coupled to the NB/NCH through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204.

An operating system runs on processing unit 206. The operating system coordinates and provides control of various components within, data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
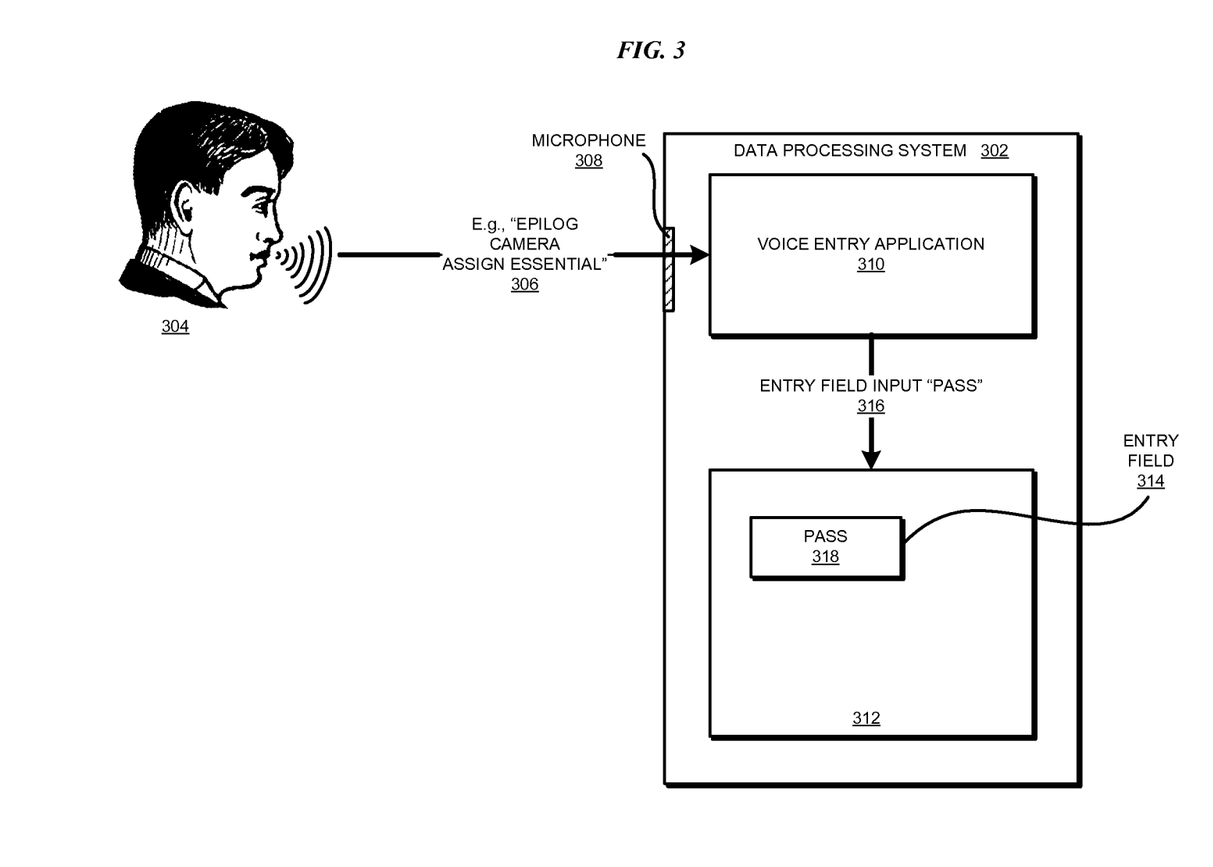
FIG. 3 depicts a block diagram of an example voice entry of sensitive information in accordance with an illustrative embodiment.

With reference to FIG. 3, this figure depicts a block diagram of an example voice entry of sensitive information in accordance with an illustrative embodiment. Data processing system 302 is similar to any of servers 104 and 106, clients 110, 112, and 114, or device 120 in FIG. 1. Only as an example, and without implying any limitation of an illustrative embodiment thereto, data processing system 302 is depicted in a manner similar to device 120 in FIG. 1.

User 304 provides voice entry 306 to data processing system 302 via microphone 308 in data processing system 302. Data processing system 302 includes voice entry application 310, which implements an embodiment. Another application 312 executing in data processing system 302 presents entry field 314. Entry field 314 is to be populated with data.

Operating in accordance with an illustrative embodiment, voice entry application 310 includes a process that converts voice entry 306 into entry field input 314 into data 318 for entry field 316. As an example, entry field 316 is selected for data entry by user 304 or by a process in data processing system 302. A conversion of voice entry 306 into entry field input 316 occurs via one or more conversion rules. A conversion rule is logic according to which voice entry 306 is processed into entry field input 316.

Assume for example that an example conversion rule is that the second letter of every word in voice entry 306 is used to construct entry field input 316. For example, use 304 speaks the phrase "EPILOG CAMERA ASSIGN ESSENTIAL" as voice entry 306. Among other operations, voice entry application 310 performs a conversion of that phrase using chat conversion rule such chat "P", "A", "S", and "S" letters are selected from the recognized words "EPILOG," "CAMERA," "ASSIGN," and "ESSENTIAL," respectively. The letters, put together, form "PASS" which is the data to be input in entry field 314.

Voice entry application 310 constructs the word "PASS" from the voice entry phrase "EPILOG CAMERA ASSIGN ESSENTIAL." Voice entry application 310 provides the word "PASS" entry field input 316 to application 312. Application 312 applies the data "PASS" to entry field 314. Operating in this example manner, using this example conversion rule, an embodiment allows the actual data—"PASS"—to be obfuscated from eavesdropping or overhearing when user 304 speaks voice entry 306.

The depicted example uses a one step conversion rule, based on an offset into the recognized words from the voice entry. In a similar manner, an embodiment can use any suitable conversion rule to convert a given voice entry 306 into an appropriate entry field input 316.

For example, another conversion rule may include a two-step conversion process. The user may speak an acronym; a first conversion step converts the acronym into the full text form; a second conversion step identifies letters at certain offsets into the full text words. Thus, in one example operation of this two-step example conversion, "E.D.I." spoken as voice entry results in "Electronic Data interchange", which results in "eidain" by selecting the first two letters of each word, and "eidain" forms the entry field input.

As another example, another conversion rule may include a three-step conversion process. For example, the user may speak "England." A first step in the conversion process is recognizing, such as by using a dictionary, that a country name is being spoken. A second step identifies a capital city of that country, to wit, "London," such as by using a database. A third step locates the whole degrees of latitude and longitude for the city using a geocoding application to be 51 and 0, and concatenates the numbers to form a numeric combination "510." An embodiment thus obfuscates sensitive information of a numeric combination (510) by allowing the user to say "England" instead of "510."

Any number and type of conversions can be combined to create a conversion rule for use in voice entry application 310. Some more examples of conversions usable in this manner are, character-sets at certain index offsets within spoken words or words derived from spoken words; latitude and longitudes, time zones, or population of cities whose names are spoken or derived from spoken words; a spoken date converted, to letters corresponding to the digits in the date; letters converted to digits using a custom dictionary and the digits forming a date; length of a word used as a number; word recognized as a name and the name indicating a number, by using one or more repositories; using only the n-th word, spoken or derived; or only considering words longer than n characters, spoken or derived.

In an embodiment, sets of keywords may be assigned as control words to achieve certain results, such as upper case, or special keyboard characters. An embodiment defines a set of keywords so that the use of a keyword is not readily predictable. For example, words of weight (e.g., "heavy", "ton", "pound", or "kilo") may result in the symbol "#" being entered. Other schemes may similarly be used without departing the scope of the illustrative embodiments.

Any number of these and other similarly usable conversions can be combined together to form a conversion in voice entry application 310. Furthermore, the number of conversions, the combination of conversions, or both, can be changed in an embodiment. For example, one embodiment changes a type of conversion used depending on the environment in which the user may be present. For example, an embodiment can sense through microphone 308 that the user is in a noisy environment. Consequently, voice entry application 310 decides to use a more complex conversion than when the user is in a quieter environment (therefore, presumably in a location where few over-hearers are proximate to the user).

As another embodiment, an embodiment can sense through microphone 308 that the user is in a noisy environment. Consequently, voice entry application 310 decides to allow the use of shorter words in a less complex conversion than when the user is in quieter environment (presumably because the voice recognition is more difficult in noisy areas than in quiet areas). Conversely, because complex words are often easily recognized because of their unique, phonetic qualities, voice entry application 310 of an embodiment can allow the user to use specially designated words with such phonetic qualities in noisy environments.

An embodiment can make the conversion process user-specific such that voice entry application 310 uses different conversions for different users. An embodiment can also display the words as they are recognized from the spoken words or derived words. An embodiment can also read back the words as they are recognized from the spoken words or derived words. An embodiment can also allow a user to reject the recognized words and retry a voice entry.

An embodiment can also disallow use of certain words completely. An embodiment can disallow frequent reuse of words, such as by allowing a word to be reused in a voice entry only after a predetermined number of voice entries. An embodiment may disallow repeating words in the same voice entry. An embodiment may allow or disallow alternate forms of certain words. An embodiment can relax such rules for words with rare letters, such as "Q" or "X." An embodiment may use different conversion rules or combinations thereof for different entry fields.

The conversions and additional features described herein are only illustrative examples and not limiting on the embodiment. From this disclosure, those of ordinary skill in art will be able to conceive many more conversions and modifications of the conversion process and the same are contemplated within the scope of the illustrative embodiments.

Figure 4:
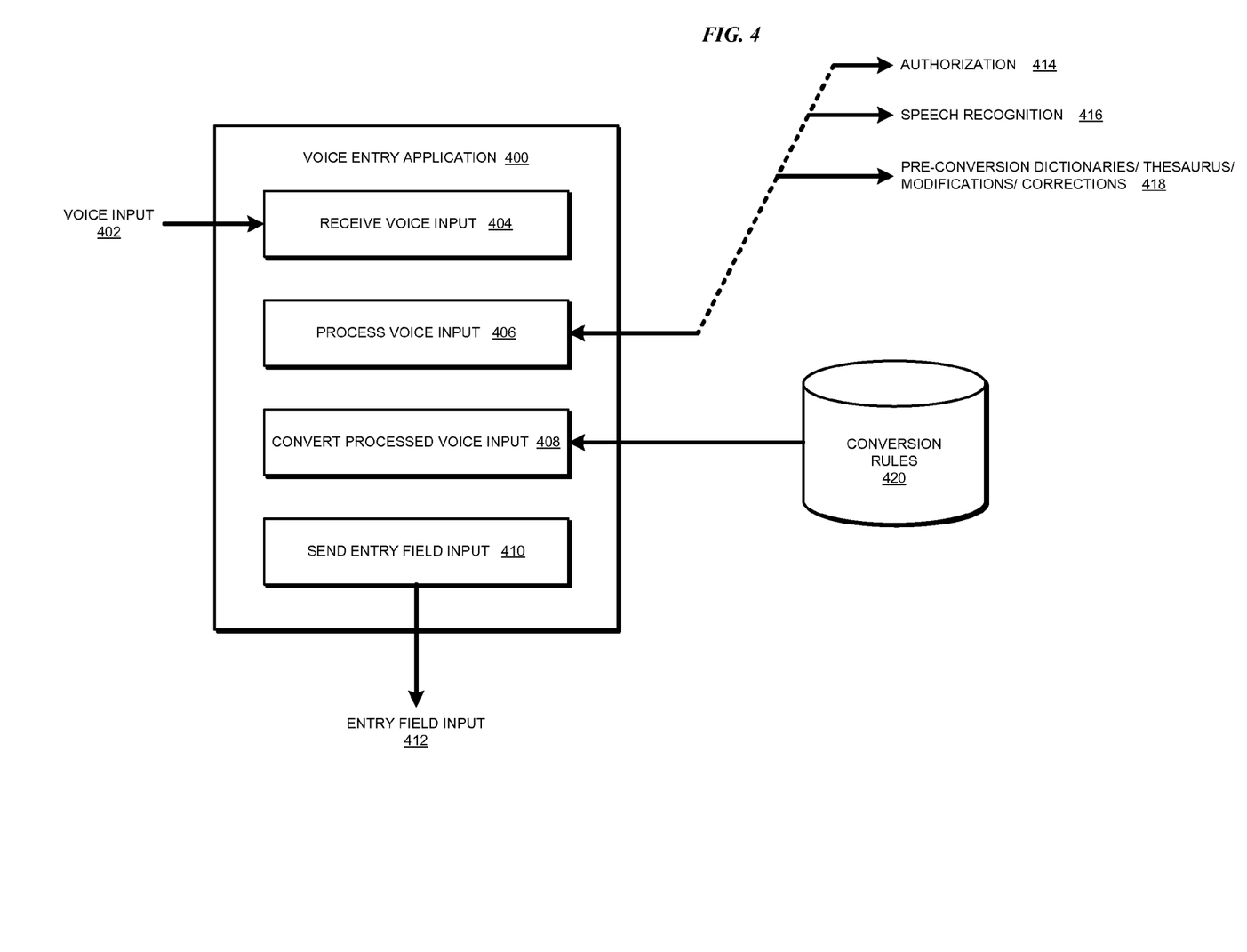
FIG. 4 depicts a block diagram of an example configuration of a voice entry application in accordance with an illustrative embodiment.

With reference to FIG. 4, this figure depicts a block diagram of an example configuration of a voice entry application in accordance with an illustrative embodiment. Voice entry application 400 is usable as voice entry application 310 in FIG. 3.

The depicted configuration is only an example manner of implementing the various functional components of voice entry application 400. Those of ordinary skill in the art will be able to implement voice entry application 400 in ocher ways to achieve similar functionality there from, and those alternate configurations are contemplated within the scope of the illustrative embodiments.

According to the depicted example configuration, voice entry application 400 receives voice input 402. Voice entry application 400 includes component 404 to receive 402 voice input provided by a user or a system. Component 406 processes the received voice input. Component 408 converts the processed voice input. Component 410 sends the entry field input constructed from the processed voice input. Entry field input 412 is an output generated by voice entry application 400, and is usable for populating an entry field in another application.

Although various components are depicted within voice entry application 400, an implementation can implement a function of a component external to voice entry application 400 without departing the scope of the illustrative embodiments. For example, in one embodiment, components 406, 408, or a combination thereof, are implemented external to voice entry application 400, such as in the form of a web-service.

Processing of a received voice input, such as in component 406, can involve other operations related to users and user inputs in general, and speech inputs in particular. For example, in one embodiment, component 406 implements authentication and authorization functions (collectively authorization functions) 414, which can be used for determining whether the user or system providing voice input 402 is authorized to do so, whether voice input 402 is from an authorized user, whether voice input 402 is provided in an authorized manner, or a combination thereof. In another embodiment, component 406 calls authorization functions 414 that may be provided by services or applications external to voice entry application 400.

In one embodiment, component 406 may similarly implement or call speech recognition functions 416 for known speech processing functions, such as speech-to-text translations. In another embodiment, component 406 may similarly implement or call other functions 418. As one example, other function 418 can include pre-conversion functions, such as noise-removal or reduction, expansion of acronyms or contraction of long-forms, alternative spelling selection, and so on. As some more examples, other functions 418 can include calling one or more custom or standard dictionaries, one or more custom or standard thesauri, or performing modifications or corrections of words or phrases recognized in voice input 402 or derived there from.

In an embodiment, component 408 uses repository 420 of conversion rules. Component 408 selects one or more conversion rules from repository 420 in performing the conversion of the processed voice input.

Figure 5:
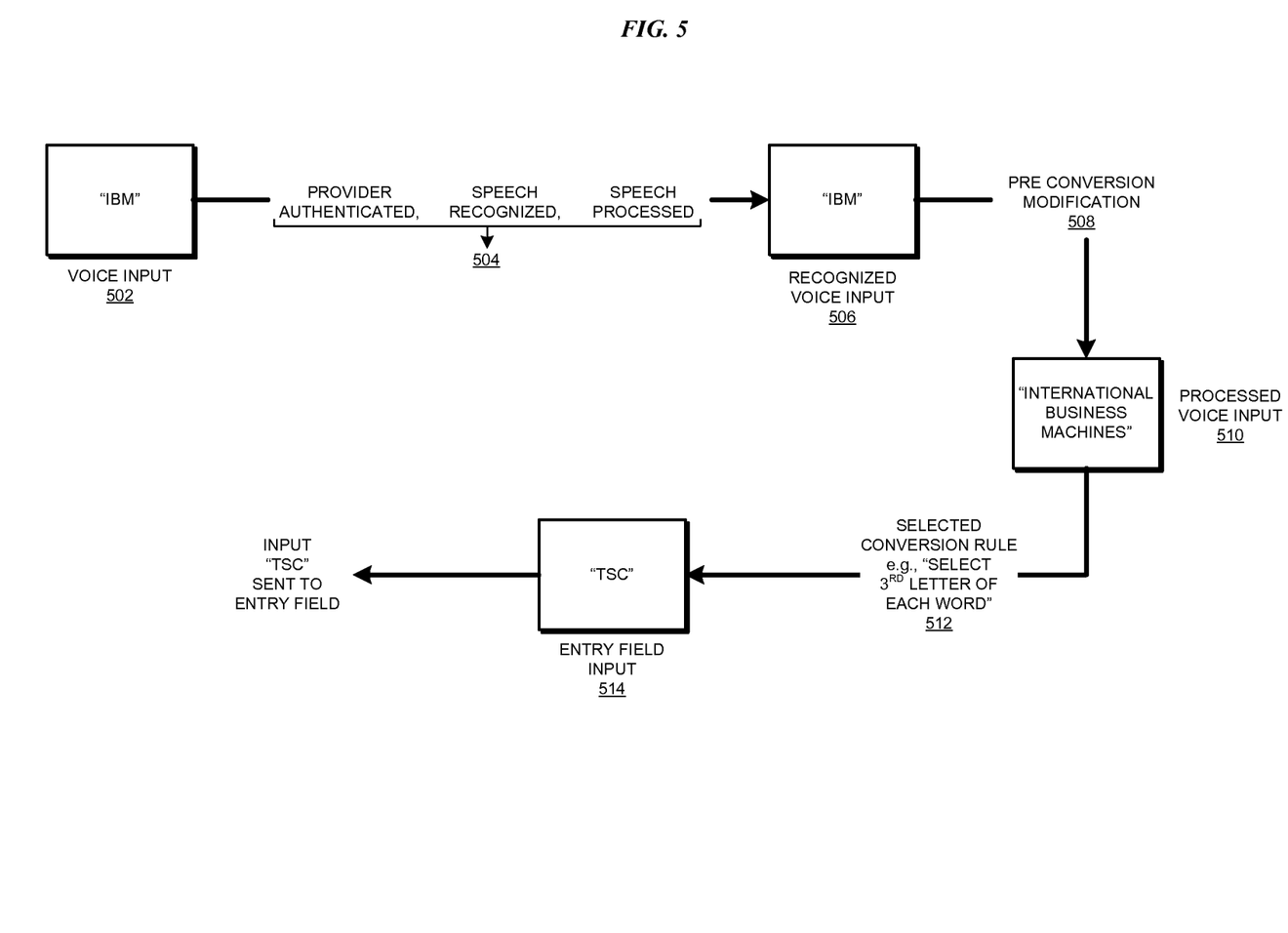
FIG. 5 depicts a process flowchart of an example conversion in a voice entry application in accordance with an illustrative embodiment.

With reference to FIG. 5, this figure depicts a process flowchart of an example conversion in a voice entry application in accordance with an illustrative embodiment. Process 500 can be implemented in voice entry application 400 in FIG. 4.

Assume that a user or a system provides voice input 502 including the acronym "IBM" (IBM and international Business Machines are trademarks of International Business Machines Corporation in the United States and other countries). Processing 504 authenticates the provider of voice input 502, performs speech recognition on voice input 502, and processes the recognized speech. Processing 504 results in recognized voice input 506, which process 500 recognizes to be an acronym. Pre-conversion modification 508 modifies the acronym IBM to the corresponding long-form "International Business Machines," which forms processed voice input 510.

Process 500 applies one or more selected conversion rules 512 to processed voice input 510. For example, the selected conversion rule may be to select the third letter of each word in processed voice input 510. Applying the selected conversion rule or rules 512 results in entry field input 514. Using the example above, the word "TSC" forms the data corresponding to entry field input 514. Process 500 sends entry field input 514 to an application that uses the data in an entry field.

Figure 6:
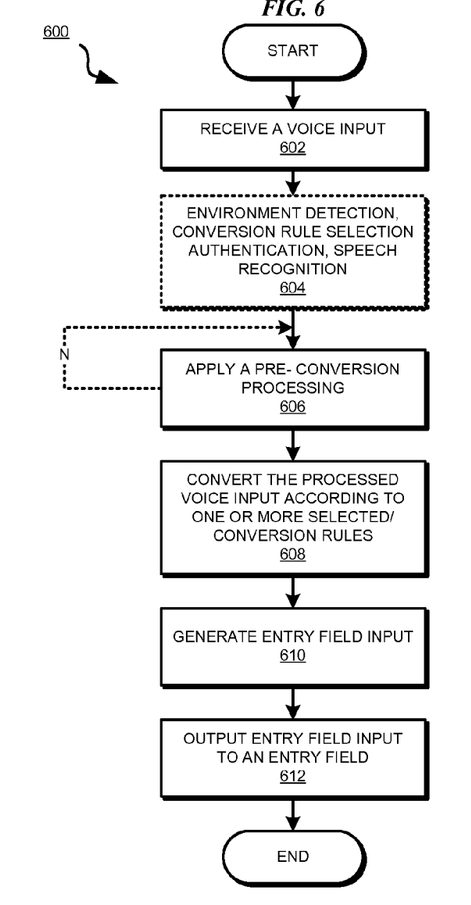
FIG. 6 depicts a flowchart of an example process of voice entry of sensitive information in accordance with an illustrative embodiment.

With reference to FIG. 6, this figure depicts a flowchart of an example process of voice entry of sensitive information in accordance with an illustrative embodiment. Process 600 can be implemented in voice entry application 400 in FIG. 4.

Process 600 begins by receiving a voice input (step 602). Process 600 may optionally perform environment detection, such as for ambient noise or acoustics, conversion rule selection instead of using a default conversion rule, provider authentication, speech recognition, or a combination thereof (step 604).

In one embodiment, the conversion rules are automatically selected by presetting the use of certain conversion rules. In such manner of selecting the conversion rules, the user is aware of the preset conversion rules.

In another embodiment, the voice entry application informs the user in a sufficiently private or confidential manner about the conversion rules being used. For example, an embodiment detects that an earphone is in use and advises the user via as discrete audio announcement to "use the second letter rule,"

In another embodiment, the user selects a subset of conversion rules from a set of conversion rules using a user interface. For example, the user may use physical or software-generated buttons, gyroscopic motions of the device, or a gesture of any suitable kind for making the selections.

In another embodiment, the user selects a subset of conversion rules from a set of conversion rules using spoken words, code-words, commands, or keywords. For example, in one embodiment, to cause the "second letter rule" to be used, the user speaks a first word to indicate the rule. "Broccoli Epilog Camera Assign Essential" Here, the first word is used to select a conversion rule for interpreting the remainder of the words. The letter "B" from the word "Broccoli" is the second letter of the alphabet, and is used by the embodiment to indicate that the user wishes to use the second letter of each following word, to wit, the second letter rule described in the examples above.

Process 600 applies a pre-conversion processing to the voice input (step 606). Process 600 can apply any number of pre-conversion processing by repeating step 606 as many times as may be needed. For example, process 600 may be implemented to use speaker-independent or speaker-dependent speech recognition. In one embodiment, process 600 is implemented to use speaker-dependent speech recognition for facilitating biometric authentication of the user, improving recognition for the user's speech that has previously been used as a training set, greater accuracy in speech recognition in suboptimal environments, or a combination thereof.

Process 600 converts the processed voice input according to one or more default or selected conversion rules (step 608). Process 600 generates an entry field input from the conversion (step 610). Process 600 outputs the entry field input to an entry field (step 612). Process 600 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Thus, a computer implemented method, system, and computer program product are provided in the illustrative embodiments for voice entry of sensitive information. An embodiment can be implemented as a layer of logic between speech recognition and data entry in certain applications. An embodiment obfuscates sensitive information by allowing a user or system to produce one speech pattern while entering unrelated data computed from the speech pattern.

A provider of the speech pattern can selectively use an embodiment for some entry fields and not others. An embodiment can offer a provider of the speech pattern a choice of conversion rules, or may select a conversion rule automatically.

An embodiment can be implemented in conjunction with other data security features, such as biometrics, and other methods. For example, an embodiment can use location awareness through Global Positioning System (GPS) location of the user to determine whether the user is in a secure location and to determine whether to use strong conversion rules or lax conversion rules.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," and storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and, or block diagram block or blocks.

The terminology used herein is for the purpose of describing particular embodiments only and is not intended to be limiting of the invention. As used herein, the singular forms "a", "an" and "the" are intended, to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for voice entry of information, the method comprising:
   detecting a characteristic of an environment in which a voice input is generated;
   selecting a conversion rule responsive to the characteristic of the environment;
   applying, using a processor and a memory, the conversion rule to the voice input;
   generating an entry field input, wherein the conversion rule allows the voice input to be distinct from the entry field input, and wherein the voice input obfuscates the entry field input; and
   providing the entry field input to an application, wherein the entry field is usable to populate a data entry field in the application.

2. The computer implemented method of claim 1, wherein the conversion rule is selected from a conversion rules repository.

3. The computer implemented method of claim 2, further comprising:
   receiving an input, wherein the input is used to select the conversion rule.

4. The computer implemented method of claim 3, wherein the input is a spoken input, and wherein the spoken input obfuscates selecting the conversion rule as a purpose of the spoken input.

5. The computer implemented method of claim 2, wherein the conversion rule replaces a default conversion rule.

6. The computer implemented method of claim 2, further comprising:
informing a provider of the voice input about the selected conversion rule prior to receiving the voice input.

7. The computer implemented method of claim 1, further comprising:
applying a pre-conversion processing to the voice input, wherein the pre-conversion processing includes authenticating a provider of the voice input.

8. The computer implemented method of claim 1, further comprising:
applying a pre-conversion processing to the voice input, wherein the pre-conversion processing includes performing speech recognition on the voice input.

9. The computer implemented method of claim 1, further comprising:
receiving the voice input.

10. The computer implemented method of claim 1, wherein the voice input is provided by a data processing system.

11. The computer implemented method of claim 1, wherein the conversion rule uses a dictionary to expand an acronym contained in the voice input to a long-form translation, further comprising:
applying a second conversion rule to the long-form translation corresponding to the acronym.

12. The computer implemented method of claim 11, wherein the dictionary is a custom dictionary corresponding to a provider of the voice input.

13. The computer implemented method of claim 1, wherein the conversion rule selects a letter at a predetermined offset in a word corresponding to a part of the voice input, and wherein the letter forms a part of the entry field input.

14. The computer implemented method of claim 1, wherein the conversion rule is a plurality of conversion rules, wherein each of the plurality of conversion rules is executed on the voice input in an order determined during a pre-conversion processing.

15. The computer implemented method of claim 1, wherein the voice input comprises at least one word, wherein the at least one word is accepted depending on a use of the at least one word in a previous voice input.

16. A computer usable program product comprising a computer usable storage device including computer usable code for voice entry of information, the computer usable code comprising:
computer usable code for detecting a characteristic of an environment in which a voice input is generated;
computer usable code for selecting a conversion rule responsive to the characteristic of the environment;
computer usable code for applying, using a processor and a memory, the conversion rule to the voice input;
computer usable code for generating an entry field input, wherein the conversion rule allows the voice input to be distinct from the entry field input, and wherein the voice input obfuscates the entry field input; and
computer usable code for providing the entry field input to an application, wherein the entry field is usable to populate a data entry field in the application.

17. The computer usable program product of claim 16, wherein the computer usable code is stored in a computer readable storage medium in a data processing system, and wherein the computer usable code is transferred over a network from a remote data processing system.

18. The computer usable program product of claim 16, wherein the computer usable code is stored in a computer readable storage medium in a server data processing system, and wherein the computer usable code is downloaded over a network to a remote data processing system for use in a computer readable storage medium associated with the remote data processing system.

19. A data processing system for voice entry of information, the data processing system comprising:
a storage device, wherein the storage device stores computer usable program code; and
a processor, wherein the processor executes the computer usable program code, and wherein the computer usable program code comprises:
computer usable code for detecting a characteristic of an environment in which a voice input is generated;
computer usable code for selecting a conversion rule responsive to the characteristic of the environment;
computer usable code for applying the conversion rule to the voice input;
computer usable code for generating an entry field input, wherein the conversion rule allows the voice input to be distinct from the entry field input, and wherein the voice input obfuscates the entry field input; and
computer usable code for providing the entry field input to an application, wherein the entry field is usable to populate a data entry field in the application.

* * * * *